United States Patent [19]
Nicoli et al.

[11] Patent Number: 6,037,543
[45] Date of Patent: *Mar. 14, 2000

[54] WIRING DUCT FITTINGS

[75] Inventors: Robert Nicoli, Glendwood; Randall T. Woods, Bartlett, both of Ill.

[73] Assignee: Panduit Corp., Tinley Park, Ill.

[ * ] Notice: This patent is subject to a terminal disclaimer.

[21] Appl. No.: 09/080,499

[22] Filed: May 18, 1998

Related U.S. Application Data

[62] Division of application No. 08/340,968, Nov. 17, 1994, Pat. No. 5,753,855.

[51] Int. Cl.⁷ .................................................. H02G 3/00
[52] U.S. Cl. ......................... 174/72 R; 174/49; 174/101; 52/287.1; 138/157
[58] Field of Search .................................. 174/49, 72 C, 174/72 R, 101, 99 R, 68.3; 52/287.1; 138/157, 92, 162; 248/480, 200.1, 217.2; D13/155

[56] References Cited

U.S. PATENT DOCUMENTS

| | | | |
|---|---|---|---|
| 1,590,569 | 6/1926 | Fisk | 439/17 |
| 3,351,699 | 11/1967 | Merckle . | |
| 4,518,141 | 5/1985 | Parkin | 248/546 |
| 4,602,124 | 7/1986 | Santucci . | |
| 4,612,746 | 9/1986 | Higgins | 52/221 |
| 4,891,471 | 1/1990 | Ono et al. . | |
| 4,951,716 | 8/1990 | Tsunoda et al. . | |
| 5,399,812 | 3/1995 | Woszczyna et al. | 174/97 |

FOREIGN PATENT DOCUMENTS 2206744  1/1989  United Kingdom .

OTHER PUBLICATIONS

National Electronic Products Corporation Catalog and Handbook, "La–in," 1950's, pp. 34–35 "no date".

Primary Examiner—Kristine Kincaid
Assistant Examiner—Dhiru R Patel
Attorney, Agent, or Firm—Robert A. McCann

[57] ABSTRACT

A duct fitting for joining a plurality of separate duct sections is provided. The fitting cover includes flanges formed on the sidewalls for engaging with a corresponding recess in the duct section to provide engagement, and further includes an independent latch for securing the cover to the base fitting. The T-shaped fitting is also provided with a divider insert which allows for proper routing of wires into the selected channels while maintaining the proper bend radii for the wires or cables.

9 Claims, 5 Drawing Sheets

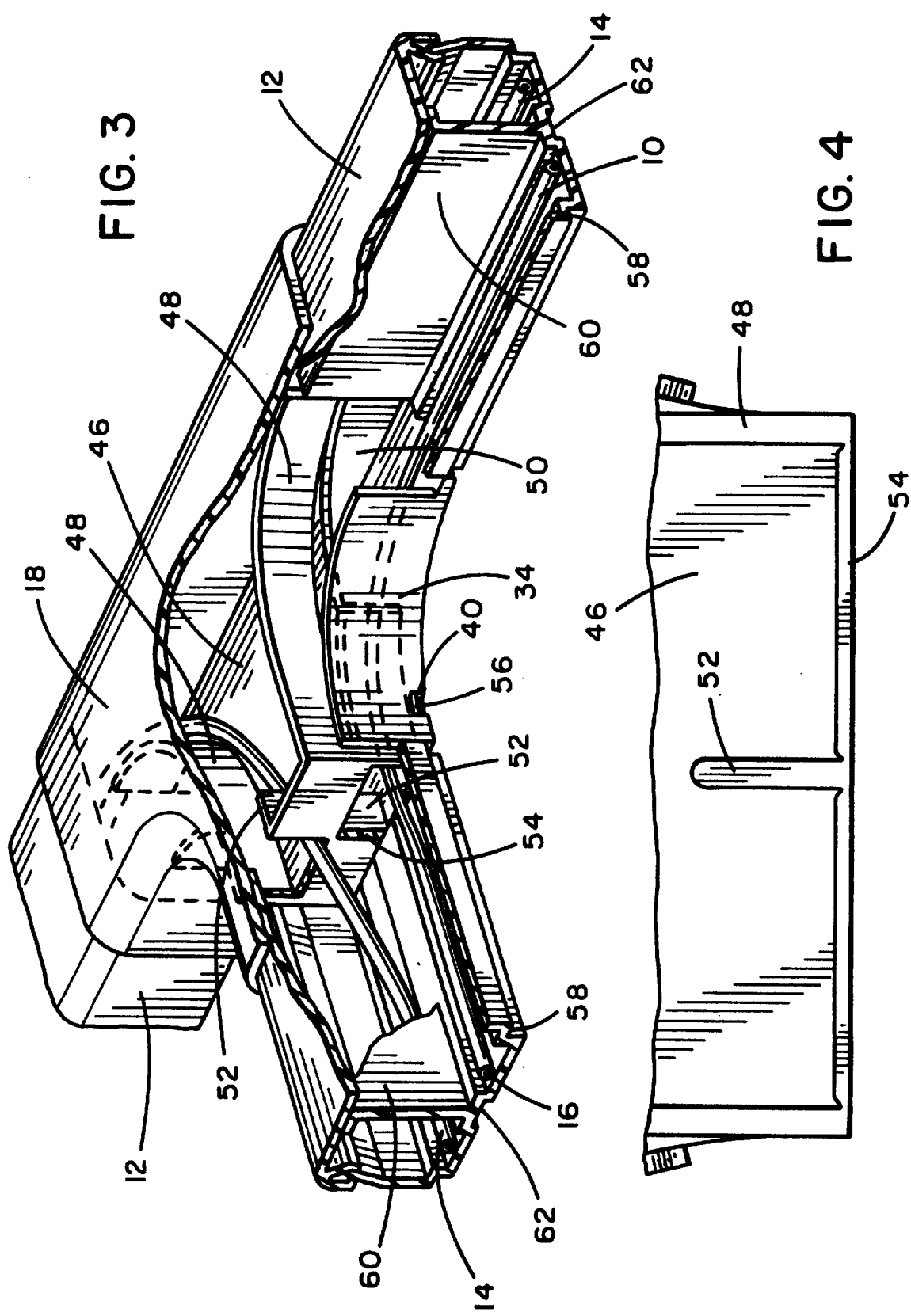

WIRING DUCT FITTINGS

This is a divisional of application Ser. No. 08/340,968, filed Nov. 17, 1994 is now U.S. Pat. No. 5,753,855.

FIELD OF THE INVENTION

The present invention relates generally to wiring duct fittings for connecting separate sections of wiring duct. More specifically, the invention relates to an improved duct fitting having a cover that cooperates with the separate wiring duct sections and also securely engages the fitting base.

BACKGROUND OF THE INVENTION

Duct fittings having a variety of configurations for joining separate sections of wiring duct are well known in the industry. It is important for duct fitting covers and bases to be securely latched, not only to the duct sections that they are joining, but also to each other. In particular, during power applications the wires can heat up and over a period of time result in stress relief in plastic parts. Therefore, it is very important to ensure that the fitting cover maintain engagement with the fitting base. This can be especially problematic on fittings having a relatively long wall, such as the top of a T-shaped fitting or the outside wall of an elbow fitting. When the fitting cover is only secured by its engagement with the wiring duct section, the long wall of a fitting cover is more likely to become disengaged and detach from the base.

It is also well known in the industry to utilize wiring duct for containing both power and communication wires. It is necessary for these purposes to keep the power wires separate from the communication wires. Therefore, ducts are formed with a divider wall to route both power and communication wires in separate channels within the same duct. It is, therefore, equally important to maintain the separation of the power and communication wires while being routed within the duct fittings. This can be particularly problematic for a T-junction where a T-shaped fitting is used for wires entering from the stem end, from both the left and right side of the duct, to be routed to either of the left or right channels of the left and right wiring ducts joining at the top part of the T-junction.

Furthermore, with the increase in communication wires, it has become increasingly important to properly divide channels within fittings and maintain proper minimum bend radii for wires being routed around corners. The EIA/TIA has set standards for appropriate minimum bend radii to avoid over bending of wires or cables. Therefore, it is particularly important when fittings are used, as this is where bending of the wires or cables will occur. Maintaining the proper bend radii is similarly problematic when a T-junction is used for divided ducts containing both power and communication wires.

SUMMARY OF THE INVENTION

It is therefore an object of the present invention to provide an improved duct fitting.

It is a further object of the present invention to provide a duct fitting having improved interlocking features.

It is still further an object of the present invention to provide a duct fitting having a divider insert member that allows for the maintaining of proper routing of wires in separate channels.

It is another object of the present invention to provide a duct fitting and fitting dividers that maintain proper wire bend radii.

The foregoing objects are obtained by providing a duct fitting including a cover and base that cooperate to form a chamber having a plurality of open joint ends for mating with a plurality of separate wiring duct sections, with means for engaging the duct fitting to the wiring duct sections disposed on the cover, and latching means for securing the fitting cover to the fitting base, including a lip formed on a distal end of a sidewall of the cover for cooperating with a hook projecting from the base, and also including a fitting divider insert for positioning within a wiring duct fitting, having means for separating the duct fitting into upper and lower routing passageways, and means for separating the duct fitting into left and right routing passageways.

Other objects and advantages of the invention will become apparent from the following detailed description.

BRIEF DESCRIPTION OF THE DRAWINGS

FIG. 3 is a perspective view of a T-section of a duct network joined by the duct fitting of FIG. 2;

FIG. 4 is a top sectional view of a front portion of the divider insert of FIG. 2;

DESCRIPTION OF THE PREFERRED EMBODIMENT

Figure 1:
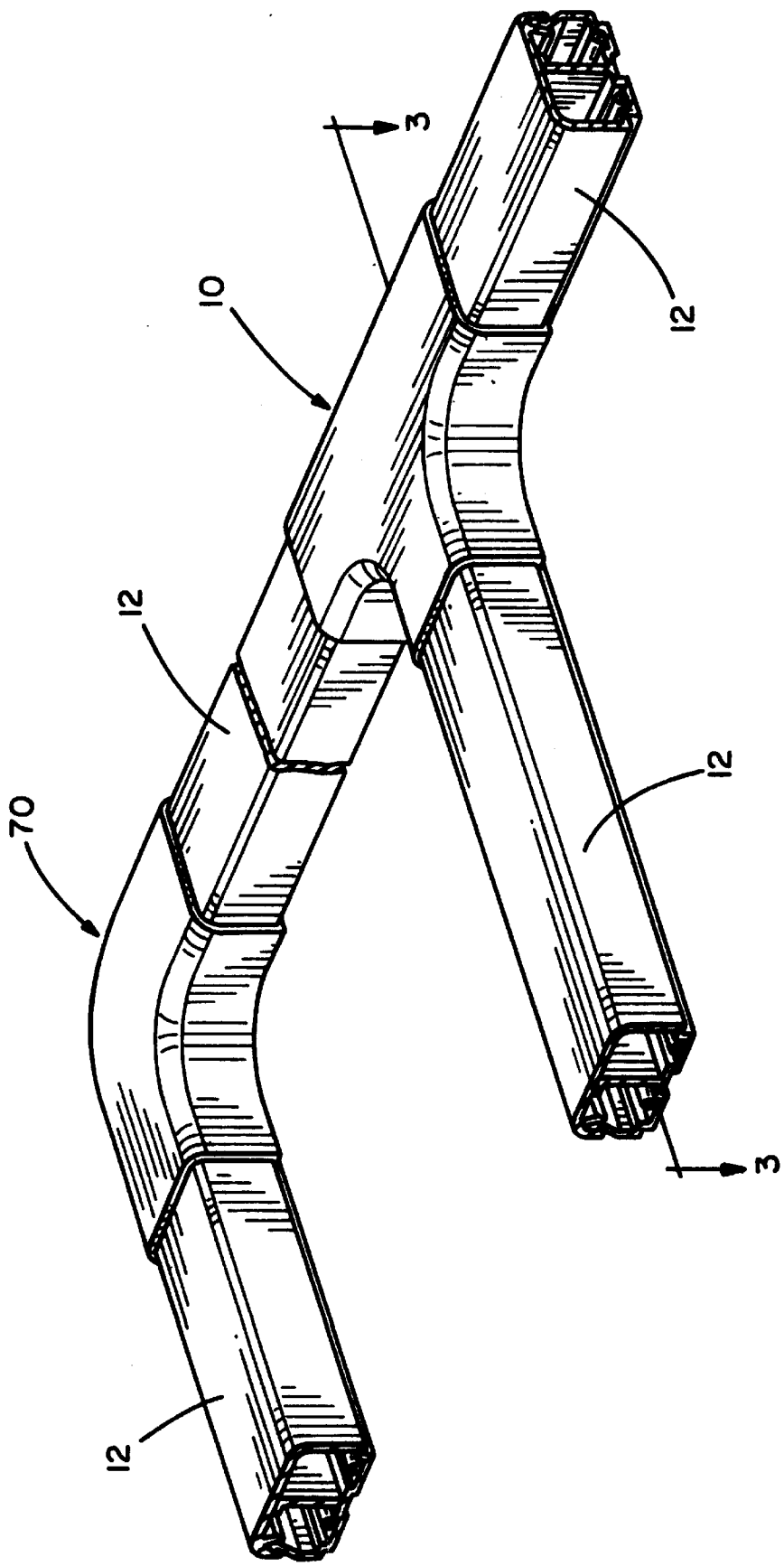
FIG. 1 is a perspective view of a wiring duct network utilizing fittings embodying the concept of the present invention.

A duct fitting embodying the concept of the present invention is designated generally by the reference numeral 10 in the accompanying drawings. FIG. 1 shows a T-shaped duct fitting 10 and an alternate configuration of the duct fitting 70 of the present invention shown joining a plurality of separate wiring duct sections 12 for the purposes of containing and routing electrical and/or communication wires.

Figure 2:
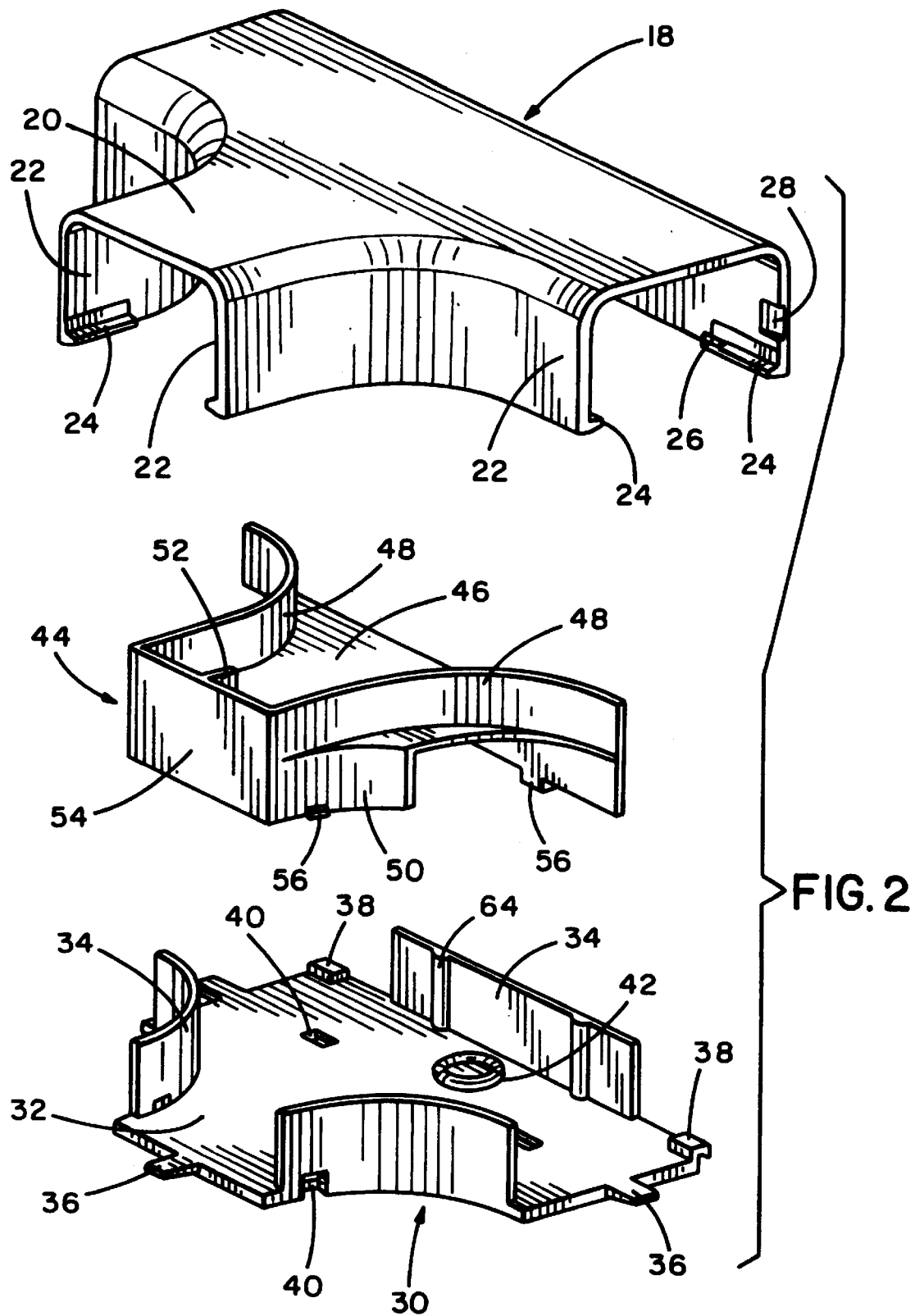
FIG. 2 is an exploded perspective view of a T-fitting cover, base and divider insert of the present invention.
Figure 5:
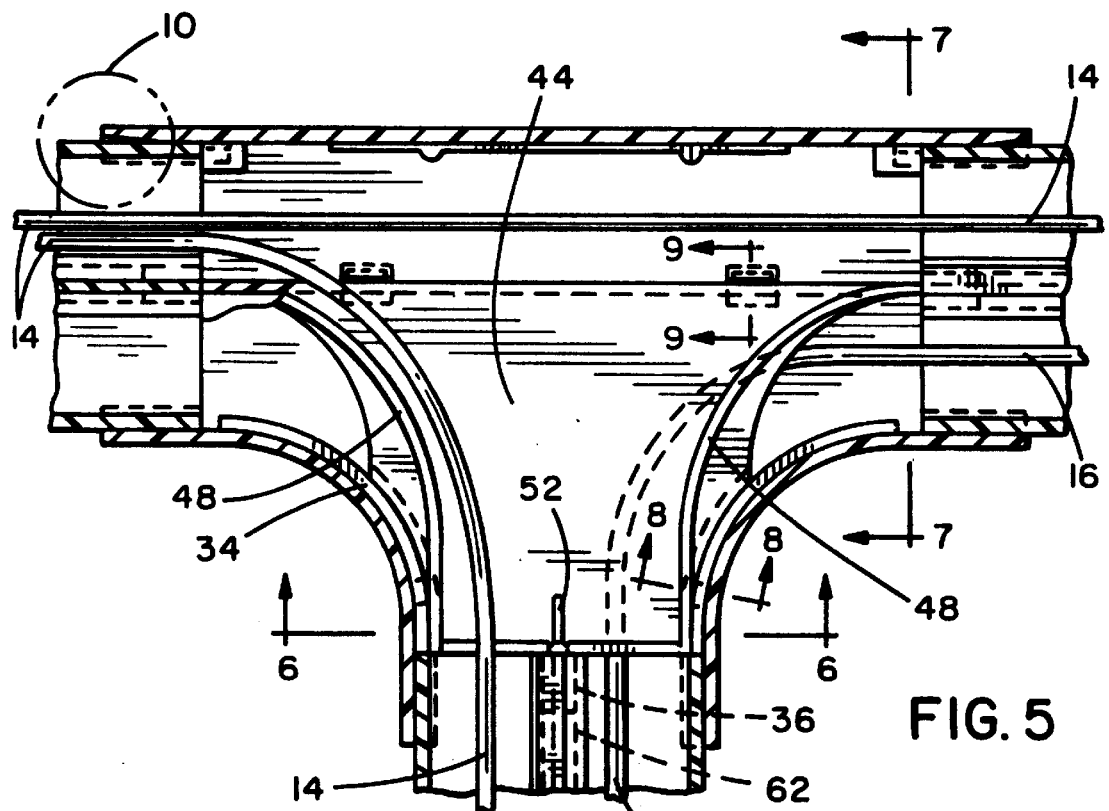
FIG. 5 is a sectional plan view of the duct fitting cover, base and divider insert of the present invention.
Figure 7:
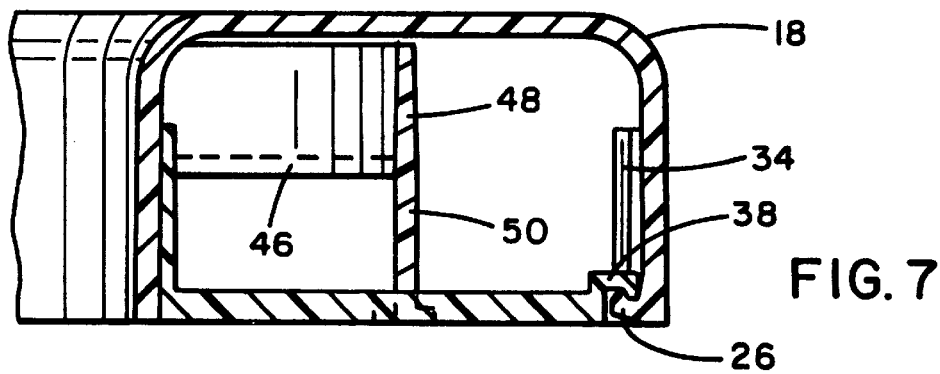
FIG. 7 is a partial view of the duct fitting along lines 7—7 of FIG. 5.

Duct fitting 10 includes a fitting cover 18 and a fitting base 30, which cooperate to form a T-shaped chamber having three open joint ends, each for mating with a respective wiring duct section 12. Fitting cover 18 is formed to have a substantially inverted U-shape with a planar lid 20 and a plurality of integrally formed downwardly extending perpendicular sidewalls 22. A plurality of flanges 24 are formed at the distal ends of sidewalls 22 on the duct joining open ends of cover 18. As shown in FIG. 3, flanges 24 cooperate with recesses 58 formed on the outer lower sidewalls of the wiring duct sections 12 to fasten fitting cover 18 to duct 12. Also formed on the distal ends of the relatively long top sidewall 22 of the T-shaped fitting 10 are lips 26. Lips 26 engage with corresponding locking hooks 38 formed on the fitting base 30 to secure the cover 18 to the base 30. As can be seen in FIGS. 2 and 5, lips 26 are spaced inwardly from the edge of the joint ends of cover 18 with the flange 24 running from the joint end until adjacent to the inwardly spaced lip 26, so that upon engagement with fitting base 30, the cover 18 and flanges 24 extend onto the wiring duct sections 12 so that flanges 24 can engage with recesses 58. As best seen in FIGS. 2 and 7, lip 26 is formed so as to extend inwardly from a distal end of sidewall 22. Locking hook 38 is formed on a marginal end of the base at a joint end such that it has a hook shape that interlocks with lip 26.

Fitting base 30 has a floor section 32 and a plurality of perpendicular sidewalls 34 extending from the marginal edges of the fitting base 30. In addition to hook 38, fitting base 30 includes a plurality of centrally disposed duct engaging tabs 36 formed on the duct joining ends of base 30, which engage with duct engaging indentations 62 formed in the center of the bottom of the separate wiring duct sections 12 so that ducts 12 abut base 30 at each duct joint end.

When, for example, three separate wiring ducts 12 are to be joined by a T-fitting 10, such as that shown in FIG. 2, the indentations 62 of ducts 12 are aligned with and engaged to tabs 36 of base 30. Then the wires are accordingly routed within fitting base 30, and cover 18 is placed over base 30 and ducts 12 so that lips 26 interlock with hooks 38 and flanges 24 engage recesses 58. The extra interlocking of the cover 18 to base 30 along the long sidewall 22 will prevent cover 18 from becoming disengaged over time as a result of stress relief in the plastic part. The hooks 38 and lips 26 are shown here as being formed only on the long sidewall 22, as this is the sidewall in which disengagement is most likely. It is to be noted, however, that they could also be formed on the remaining sidewalls 22.

As can be seen in FIG. 2, the preferred embodiment of fitting base 30 includes posts 64 integrally formed with a straight sidewall 34, which help in the molding process, as well as providing additional strength for the sidewalls. The base 30 also includes a raised circular ridge 42 which acts as a protector for wires from a screw head when the base is fixedly mounted by a screw. As can also be seen in FIG. 2, cover 18 includes a pry slot 28 which allows for the insertion of a screwdriver or similar tool to remove cover 18 from base 30.

As best seen in FIG. 3, a T-fitting 10 is necessary, for example, in situations where wires within a single vertically oriented duct 12 are to be branched into a pair of horizontally oriented ducts 12 extending in the left and right directions. Therefore, when both power 14 and communication 16 wires are carried, divided channel wiring duct such as that shown having a divider wall 60 must be used to separate the different types of wires. As shown in FIGS. 3 and 5, the T-junction results in the divided vertical duct 12 leading wires 14, 16 into the stem of fitting 10 and divided horizontal ducts 12 leading away from both the left and right sides of the top of the T-fitting 10. It is necessary to provide routing passageways from both the left and right channels of the vertical duct 12 that allow for routing to either of the top side or stem side channels of both the left and right horizontal ducts 12.

To achieve this result, as can also be seen in FIG. 2, there is provided a fitting insert divider, which is secured within the duct fitting 10 to maintain the proper bend radii of the wires while also providing routing passageways for the power and communication wires through separate channels of duct fitting 10. Divider insert 44 includes a planar floor 46 having a top and bottom side and a plurality of sidewalks 48, 50 extending from both sides of floor 46, such that floor 46 is disposed substantially at a vertical midpoint of sidewalls 48, 50. This creates a divided chamber within fitting 10 of upper and lower passageways for the wires. The sidewalls 48, 50 of divider insert 44 are formed so that their curvature corresponds with the EIA/TIA compliant minimum bend radii requirements, e.g., 1" for certain communication wires.

As can be seen in FIGS. 2 and 5, the floor 46 of the divider insert 44 extends into the fitting a sufficient distance so that the lower sidewall 50 extending from the top horizontal side edge of floor corresponds to the divider wall 60 of the left and right horizontal wiring ducts 12. Engagement protrusions 56 are formed on this top horizontal side lower sidewall 50 and the stem side lower sidewalls 50 to provide engagement with insert holes 40 formed in base 30. The lower sidewalls 50 on the stem side of divider 44 lead from the left or right side of the vertical wiring duct 12 into the stem side channel of the corresponding left or right horizontal wiring ducts 12. The upper sidewalls 48 on the stem side of divider 44 lead from the left or right side of the vertical wiring duct 12 into the top side channel of the corresponding left or right horizontal wiring ducts 12. The sidewalls 48, 50 are all shaped to comply with EIA/TIA minimum bend radii requirements.

The divider insert 44 also is provided with a partition 52, which is perpendicularly disposed to the floor 46, such that the wire entrance end of the fitting at the stem end will be separated into left and right access passageways. The divider insert 44 thus allows for selective routing of both power 14 and communication 16 wires to maintain accurate separation of the different types of wires.

Figure 6:
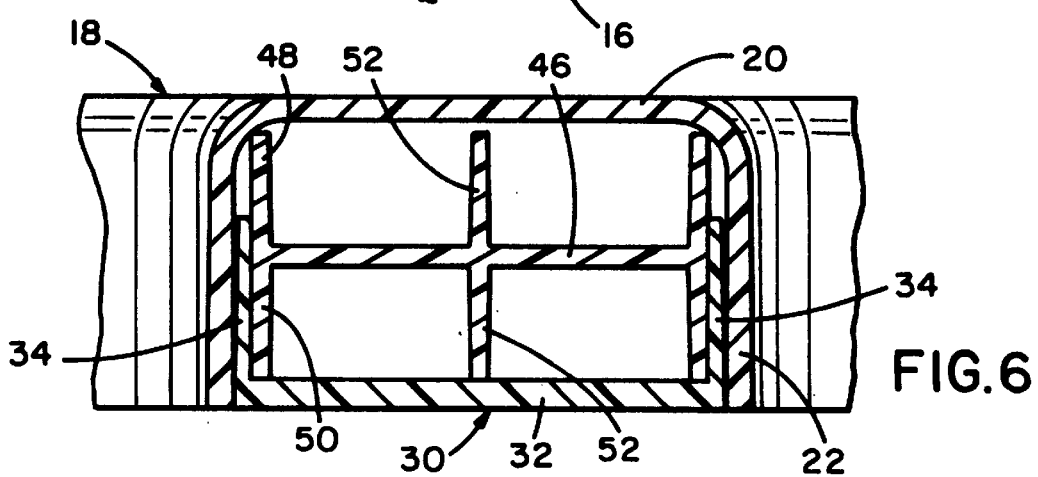
FIG. 6 is a partial view of the duct fitting along lines 6—6 of FIG. 5.

As shown in FIG. 2, the divider insert is further provided with a blockout wall 54 which as shown blocks off access from the stem wiring duct 12 into the fitting 10. The blockout wall 54 forms four breakout sections, which the installer can remove to direct the power or communication wires between the appropriate channels of the wiring duct 12. As best seen in FIG. 3, the upper left and lower right breakout portions of blockout wall 54 have been removed. In this example, the power wire 14 on the left side of the vertical wiring duct 12 is routed to the upper chamber of fitting 10 and can only be routed into the top side channel of the horizontal wiring ducts 12. Similarly, the communication wire 16 on the right side of the vertical wiring duct 12 is routed to the lower chamber of fitting 10 and can only be routed into the stem side channel of the horizontal wiring ducts 12. As can be seen in FIG. 6, the divider insert creates four separate channels for routing both the power and communication wires 14, 16 along their desired paths. The insert 44 also allows for an unimpeded run through fitting 10 from either the top or stem side channels from the left to right horizontal wiring ducts 12.

Figures 8, 9:
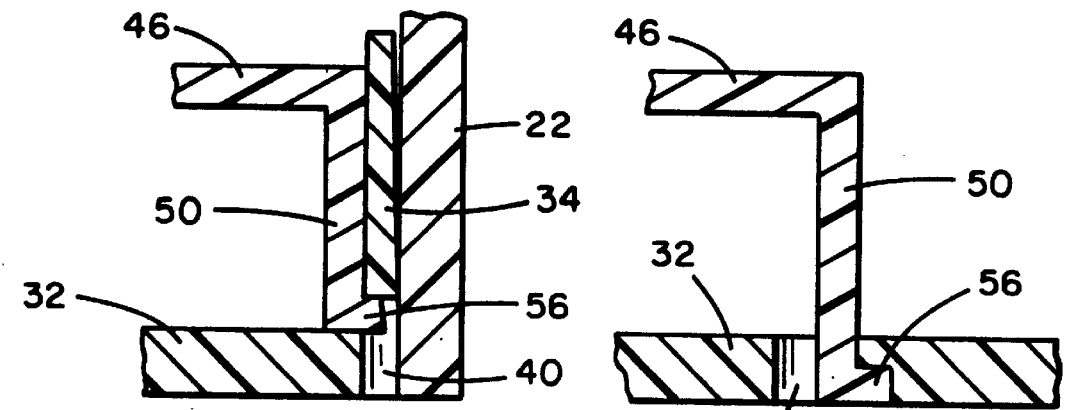
FIG. 8 is a partial view of the duct fitting along lines 8—8 of FIG. 5.
FIG. 9 is a partial view of the duct fitting along lines 9—9 of FIG. 5.

FIGS. 8 and 9 show close up views of the latching mechanism of the divider insert to the fitting base of the present invention.

Figure 10:
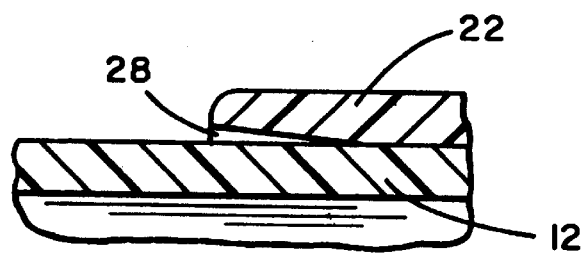
FIG. 10 is an enlarged partial view of the area in circle 10 of FIG. 5.

FIG. 10 shows a close up view of the removal pry slot 28 formed on the inside wall of the fitting cover 18 to allow for removal of the fitting cover 18 from the fitting base 30.

Figure 11:
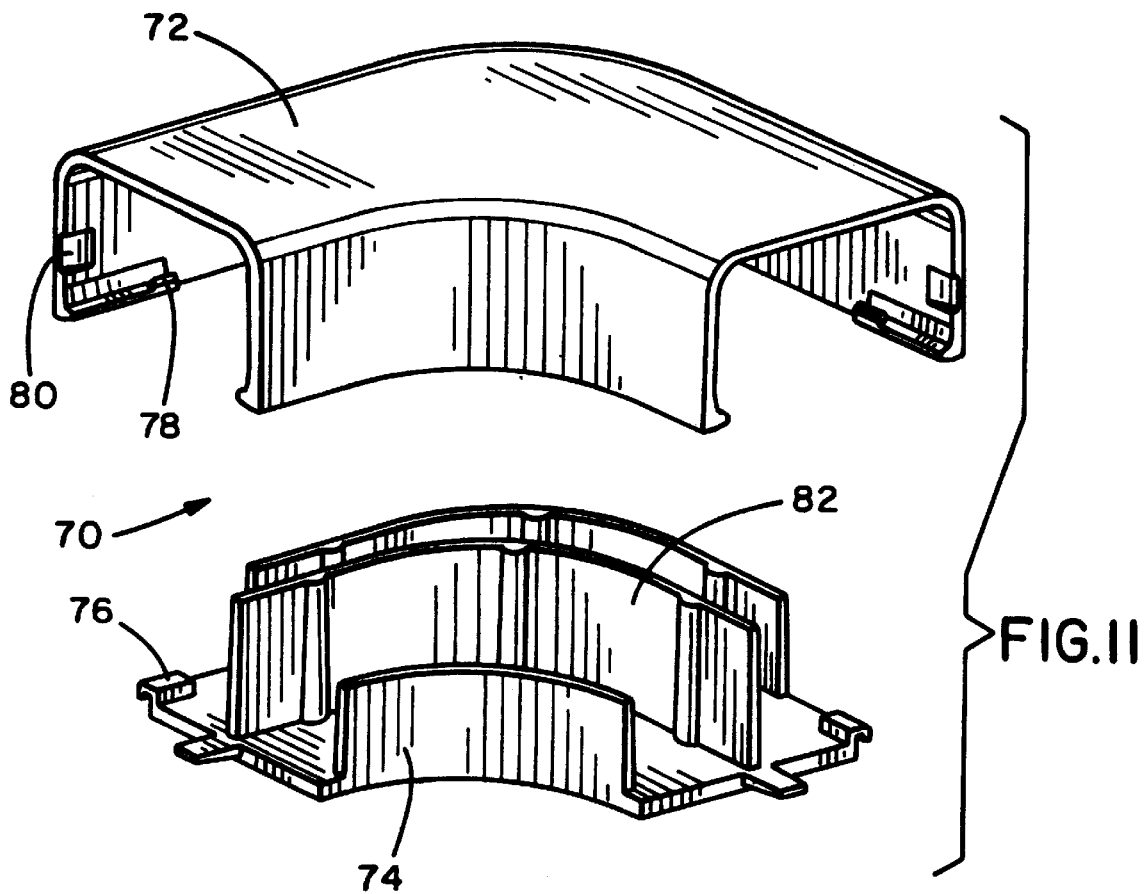
FIG. 11 is an exploded perspective view of another ebodiment of the present invention.

FIG. 11 shows one alternate embodiment of the present invention. In the case of this elbow fitting, a divider insert is not necessary. The fitting base has a single divider wall 82 to maintain separation of the wires in the appropriate channels while also utilizing EIA/TIA compliant bend radii requirements. In this fitting 70, the lip 78 interlocks with hook 76 to secure the cover to the base. The flange and the centrally disposed base tabs cooperate with the wiring duct recess and the duct slots to secure the fitting 70 to the duct sections.

While a T-shaped fitting has been shown and described above, as well as the alternate embodiment elbow fitting 70, there are a wide variety of shapes and configurations of standard duct fittings not shown to which the present invention would also be applicable.

While the particular embodiments of the present invention have been shown and described, it will be obvious to those skilled in the art that changes and modifications may be made without departing from the invention in its broadest aspects. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A duct fitting including a cover and base that cooperate to form a chamber having a plurality of open joint ends for mating with a plurality of separate wiring duct sections, comprising:

a flange disposed on the cover extending inwardly from a distal end of the sidewall of the cover for engaging the fitting cover to one of the wiring duct sections; and a lip formed on a distal end of a sidewall extending upwardly with respect to the flange.

2. A duct fitting according to claim 1, wherein the lip is disposed along the sidewall spaced from a joint end of the cover so as to be complementary to a hook projecting from the base.

3. A duct fitting according to claim 2, wherein the hook is formed on a marginal end of the base at a joint end.

4. A duct fitting according to claim 1, wherein the lip is formed contiguous to the flange.

5. A duct fitting according to claim 1, further including insert securing means formed on the base for securing a divider insert within the fitting.

6. A duct fitting having a plurality of joint ends for joining a plurality of separate wiring duct sections, comprising:

a base;

a cover having a lid and a plurality of sidewalls, wherein at least one sidewall includes a flange extending inwardly from a distal end of the sidewall; and a lip formed on a distal end of the sidewall, extending upwardly with respect to the flange.

7. A duct fitting according to claim 6, wherein the lip is formed at a distance spaced inward from a joint end of the cover so as to correspond with a hook formed at a joint end of the base.

8. A duct fitting according to claim 7, wherein the lip projects from the flange.

9. A duct fitting according to claim 6, further including insert securing means formed on the base for securing a divider insert within the fitting.

* * * * *

UNITED STATES PATENT AND TRADEMARK OFFICE
CERTIFICATE OF CORRECTION

PATENT NO.    : 6,037,543
DATED         : March 14, 2000
INVENTOR(S)   : Nicoli et al.

It is certified that error appears in the above-identified patent and that said Letters Patent is hereby corrected as shown below:

<u>Title page,</u>
Item [62], "Division" should be -- Continuation --; and after the comma -- filed -- should be inserted.

<u>Column 1,</u>
Line 3, "divisional" should be -- continuation --.
Line 4, after "1994" -- , -- should be inserted.
Line 4, "is" should be deleted.

<u>Column 5,</u>
Line 25, "the" should be -- a --.
Line 26, "fitting" should be deleted.
Line 27, the second occurrence of "a" should be -- the --.
Line 27, the third occurrence of "a" should be -- the --.
Line 27, after "sidewall" -- of the cover -- should be inserted.

<u>Column 6,</u>
Line 2, after "sidewall" -- of the cover -- should be inserted.
Line 17, after "one" -- of said plurality of -- should be inserted.
Line 17, "sidewall" should be -- sidewalls --.
Line 18, "the" should be deleted.
Line 18, after "of" -- one of said plurality of -- should be inserted.
Line 18, "sidewall" should be -- sidewalls --.
Line 19, the second occurrence of "a" should be -- the --.
Line 19, the second occurrence of "the" should be deleted.
Line 19, after "of" -- one of said plurality of -- should be inserted.
Line 19, "sidewall" should be -- sidewalls --.

Signed and Sealed this

Twenty-fourth Day of December, 2002

JAMES E. ROGAN
*Director of the United States Patent and Trademark Office*